US008102317B2

(12) United States Patent
Lee et al.

(10) Patent No.: US 8,102,317 B2
(45) Date of Patent: *Jan. 24, 2012

(54) LOCATION IDENTIFICATION USING BROADCAST WIRELESS SIGNAL SIGNATURES

(75) Inventors: Andy Lee, Union City, CA (US); James J. Spilker, Jr., Woodside, CA (US); Matthew Rabinowitz, Portola Valley, CA (US); Jimmy K. Omura, San Francisco, CA (US)

(73) Assignee: TruePosition, Inc., Berwyn, PA (US)

( * ) Notice: Subject to any disclaimer, the term of this patent is extended or adjusted under 35 U.S.C. 154(b) by 1556 days.

This patent is subject to a terminal disclaimer.

(21) Appl. No.: 11/284,800

(22) Filed: Nov. 22, 2005

(65) Prior Publication Data

US 2007/0050824 A1  Mar. 1, 2007

(51) Int. Cl.
*G01S 3/02* (2006.01)
(52) U.S. Cl. .................. 342/463; 342/451
(58) Field of Classification Search .............. 342/450, 342/458, 463–465, 451; 455/456.2, 456.6
See application file for complete search history.

(56) References Cited

U.S. PATENT DOCUMENTS

| | | | |
|---|---|---|---|
| 4,555,707 A | 11/1985 | Connelly | |
| 4,652,884 A | 3/1987 | Starker | |
| 4,700,306 A | 10/1987 | Wallmander | |
| 4,894,662 A | 1/1990 | Counselman | |
| 5,045,861 A | 9/1991 | Duffett-Smith | |
| 5,157,686 A | 10/1992 | Omura et al. | |
| 5,166,952 A | 11/1992 | Omura et al. | |
| 5,271,034 A | 12/1993 | Abaunza | |
| 5,323,322 A | 6/1994 | Mueller et al. | |
| 5,398,034 A | 3/1995 | Spilker, Jr. | |
| 5,481,316 A | 1/1996 | Patel | |
| 5,504,492 A | 4/1996 | Class et al. | |
| 5,510,801 A | 4/1996 | Engelbrecht et al. | |
| 5,604,765 A | 2/1997 | Bruno et al. | |
| 5,630,206 A | 5/1997 | Urban et al. | |
| 5,648,982 A | 7/1997 | Durrant et al. | |
| 5,774,829 A | 6/1998 | Cisneros et al. | |
| 5,784,339 A | 7/1998 | Woodsum et al. | |
| 5,835,060 A * | 11/1998 | Czarnecki et al. | ............ 342/442 |
| 5,920,284 A | 7/1999 | Victor | |

(Continued)

FOREIGN PATENT DOCUMENTS

DE  3242997 A1  5/1984

(Continued)

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255-274.

(Continued)

*Primary Examiner* — Dao Phan
(74) *Attorney, Agent, or Firm* — Woodcock Washburn LLP

(57) ABSTRACT

An apparatus comprises a receiver to receive a plurality of wireless television signals each representing a television channel, and a measurement circuit to identify the television channels based on the wireless television signals. One or more of a plurality of possible locations of the apparatus are selected based on identities of the television channels identified by the measurement circuit and a plurality of associations each associating one of the possible locations with identities of the television channels expected at one of the possible locations.

12 Claims, 2 Drawing Sheets

U.S. PATENT DOCUMENTS

| | | | |
|---|---|---|---|
| 5,952,958 | A | 9/1999 | Speasl et al. |
| 5,953,311 | A | 9/1999 | Davies et al. |
| 6,006,097 | A | 12/1999 | Hornfeldt et al. |
| 6,016,119 | A | 1/2000 | Krasner |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,144,413 | A * | 11/2000 | Zatsman |
| 6,147,642 | A | 11/2000 | Perry et al. |
| 6,181,921 | B1 | 1/2001 | Konisi et al. |
| 6,184,921 | B1 | 2/2001 | Limberg |
| 6,201,497 | B1 | 3/2001 | Snyder et al. |
| 6,215,778 | B1 | 4/2001 | Lomp et al. |
| 6,289,280 | B1 | 9/2001 | Fernandez-Corbaton et al. |
| 6,317,452 | B1 | 11/2001 | Durrant et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,400,753 | B1 | 6/2002 | Kohli et al. |
| 6,433,740 | B1 | 8/2002 | Gilhousen |
| 6,437,832 | B1 | 8/2002 | Grabb et al. |
| 6,484,034 | B1 | 11/2002 | Tsunehara et al. |
| 6,522,297 | B1 | 2/2003 | Rabinowitz et al. |
| 6,559,800 | B2 | 5/2003 | Rabinowitz et al. |
| 6,559,894 | B2 * | 5/2003 | Omura et al. |
| 6,590,529 | B2 | 7/2003 | Schwoegler |
| 6,646,603 | B2 | 11/2003 | Dooley et al. |
| 6,717,547 | B2 | 4/2004 | Spilker, Jr. et al. |
| 6,727,847 | B2 | 4/2004 | Rabinowitz et al. |
| 6,753,812 | B2 | 6/2004 | Rabinowitz et al. |
| 6,806,830 | B2 | 10/2004 | Panasik et al. |
| 6,839,024 | B2 | 1/2005 | Spilker, Jr. et al. |
| 6,859,173 | B2 | 2/2005 | Spilker, Jr. et al. |
| 6,861,984 | B2 | 3/2005 | Rabinowitz et al. |
| 6,879,286 | B2 | 4/2005 | Rabinowitz et al. |
| 6,914,560 | B2 | 7/2005 | Spilker, Jr. et al. |
| 6,917,328 | B2 | 7/2005 | Rabinowitz et al. |
| 6,937,866 | B2 | 8/2005 | Duffett-Smith et al. |
| 6,952,182 | B2 | 10/2005 | Spilker, Jr. et al. |
| 6,961,020 | B2 | 11/2005 | Rabinowitz et al. |
| 6,963,306 | B2 | 11/2005 | Spilker, Jr. |
| 6,970,132 | B2 | 11/2005 | Spilker, Jr. |
| 7,042,396 | B2 | 5/2006 | Omura et al. |
| 7,042,949 | B1 | 5/2006 | Omura et al. |
| 7,126,536 | B2 | 10/2006 | Rabinowitz et al. |
| 7,260,378 | B2 | 8/2007 | Holland et al. |
| 7,269,424 | B2 * | 9/2007 | Camp, Jr. |
| 7,372,405 | B2 | 5/2008 | Rabinowitz et al. |
| 7,463,195 | B2 | 12/2008 | Rabinowitz et al. |
| 2002/0008662 | A1 | 1/2002 | Dooley et al. |
| 2002/0122003 | A1 * | 9/2002 | Patwari et al. ............ 342/450 |
| 2002/0184653 | A1 | 12/2002 | Pierce et al. |
| 2002/0199196 | A1 | 12/2002 | Rabinowitz et al. |
| 2003/0122711 | A1 | 7/2003 | Panasik et al. |
| 2003/0156063 | A1 | 8/2003 | Spilker et al. |
| 2003/0162547 | A1 | 8/2003 | McNair |
| 2004/0073914 | A1 | 4/2004 | Spilker |
| 2004/0201779 | A1 | 10/2004 | Spilker |
| 2005/0066373 | A1 | 3/2005 | Rabinowitz |
| 2005/0251844 | A1 | 11/2005 | Martone et al. |
| 2007/0121555 | A1 | 5/2007 | Burgess et al. |
| 2007/0131079 | A1 | 6/2007 | Opshaug et al. |
| 2007/0182633 | A1 | 8/2007 | Omura et al. |
| 2007/0296632 | A1 | 12/2007 | Opshaug et al. |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering*, Stanford University (Dec. 2000), pp. 59-73.

Spilker, Jr., J.J., "Fundamentals of Signal Tracking Theory," *Global Positioning System: Theory and Applications* (1994), vol. 1, Chapter 7, pp. 245-327.

Van Dierendock, A.J., "GPS Receivers," *Global Positioning System: Theory and Applications* (1995), vol. 1, Chapter 8, pp. 329-407.

Li, X., et al., "Indoor Geolocation Using OFDM Signals in HIPERLAN/2 Wireless LANS," 11$^{th}$ IEEE International Symposium on Personal Indoor and Mobile Radio Communications, PIMRC 2000, Proceedings (Cat. No. 00TH8525), Proceedings of 11$^{th}$ International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.

Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

U.S. Appl. No. 12/209,971, filed Sep. 12, 2008, Do et al.
U.S. Appl. No. 12/333,445, filed Dec. 12, 2008, Rubin et al.
U.S. Appl. No. 12/351,841, filed Jan. 11, 2009, Lee et al.
U.S. Appl. No. 10/008,613, Pierce, et al.
U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/117,676 Rabinowitz, et al.
U.S. Appl. No. 12/168,141, Furman, et al.
EP Abstract/Zusammenfassung/Abrege, 02102666.1, Oct. 19, 2004.
JP Abstract/ vol. 007, No. 241 (P-232), Oct. 26, 1983 & JP58 129277 A (Nihon Musen KK) Aug. 2, 1983.
U.S. Appl. No. 12/263,731, Rabinowitz et al.*
U.S. Appl. No. 12/476,992, Do, et al.

* cited by examiner

LOCATION IDENTIFICATION USING BROADCAST WIRELESS SIGNAL SIGNATURES

BACKGROUND

The present invention relates generally to position determination. More particularly, the present invention relates to location identification using broadcast wireless signal signatures.

SUMMARY

In general, in one aspect, the invention features an apparatus comprising: a receiver to receive one or more wireless signals; and a measurement circuit to obtain measurements of one or more characteristics of each of the wireless signals; wherein one or more of a plurality of possible locations of the apparatus are selected based on the measurements and a plurality of associations each associating one of the possible locations with expected values for the measurements for the one of the possible locations.

In some embodiments, the wireless signals are selected from the group consisting of one or more broadcast television signals, one or more broadcast radio signals, one or more navigation aid signals, one or more cellular phone network signals, and one or more wireless local area network (LAN) signals; and wherein the measurements are selected from the group consisting of a signal strength of the wireless signal, a type of the wireless signal, information content of the wireless signal, a frequency of the wireless signal, and a frequency offset of the wireless signal from a predetermined frequency. In some embodiments, a precise location of the apparatus is determined based on the one or more possible locations, the one or more wireless signals, and locations of transmitters of the one or more wireless signals. Some embodiments comprise a transmitter to transmit the measurements to a location server, wherein the location server selects the one or more possible locations of the apparatus. Some embodiments comprise a memory to store the associations; and a processor to select the one or more possible locations of the apparatus.

In general, in one aspect, the invention features an apparatus comprising: a receiver to receive measurements of one or more characteristics of each of one or more wireless signals obtained by a remote device; and a processor to select one or more of a plurality of possible locations of the remote device based on the measurements and a plurality of associations each associating one of the possible locations with expected values for the measurements for the one of the possible locations. In some embodiments, to select one or more of a plurality of possible locations of the remote device, the processor determines distances between a first vector comprising the measurements received by the receiver and one or more second vectors each comprising the expected values of the measurements, and selects the one or more of a plurality of possible locations of the remote device based on the distances. In some embodiments, the measurements comprise one or more frequency measurements of the wireless signals; and, to select one or more of a plurality of possible locations of the remote device, the processor compares ratios of the frequency measurements to corresponding ratios of the expected values for the frequency measurements. In some embodiments, the wireless signals are selected from the group consisting of one or more broadcast television signals, one or more broadcast radio signals, one or more navigation aid signals, one or more cellular phone network signals, and one or more wireless local area network (LAN) signals; and wherein the measurements are selected from the group consisting of a signal strength of the wireless signal, a type of the wireless signal, information content of the wireless signal, a frequency of the wireless signal, and a frequency offset of the wireless signal from a predetermined frequency. Some embodiments comprise a transmitter to transmit a signal representing the one or more possible locations of the remote device. In some embodiments, the processor determines a precise location of the remote device based on the one or more possible locations, the one or more wireless signals, and locations of transmitters of the one or more wireless signals. Some embodiments comprise a memory to store the associations; wherein the processor modifies the expected measurements of one or more of the associations based on the precise location determined for the remote device and the measurements obtained by the remote device.

In general, in one aspect, the invention features a computer program comprising: receiving measurements of one or more characteristics of each of one or more wireless signals obtained by a remote device; and selecting one or more of a plurality of possible locations of the remote device based on the measurements and a plurality of associations each associating one of the possible locations with expected values for the measurements for the one of the possible locations. In some embodiments, selecting one or more of the plurality of possible locations of the remote device comprises: determining distances between a first vector comprising the measurements received by the receiver and one or more second vectors each comprising the expected values of the measurements; and selecting the one or more of a plurality of possible locations of the remote device based on the distances. In some embodiments, the measurements comprise one or more frequency measurements of the wireless signals, and selecting one or more of the plurality of possible locations of the remote device comprises: comparing ratios of the frequency measurements to corresponding ratios of the expected values for the frequency measurements. In some embodiments, the wireless signals are selected from the group consisting of one or more broadcast television signals, one or more broadcast radio signals, and one or more wireless local area network (LAN) signals; and wherein the measurements are selected from the group consisting of a signal strength of the wireless signal, an analog/digital type of the wireless signal, a frequency of the wireless signal, and a frequency offset of the wireless signal from a predetermined frequency. Some embodiments comprise causing a transmitter to transmit a signal representing the one or more possible locations of the remote device. Some embodiments comprise determining a precise location of the remote device based on the one or more possible locations, the one or more wireless signals, and locations of transmitters of the one or more wireless signals. Some embodiments comprise storing the associations; and modifying the expected measurements of one or more of the associations based on the precise location determined for the remote device and the measurements obtained by the remote device.

The details of one or more implementations are set forth in the accompanying drawings and the description below. Other features will be apparent from the description and drawings, and from the claims.

Figure 1:
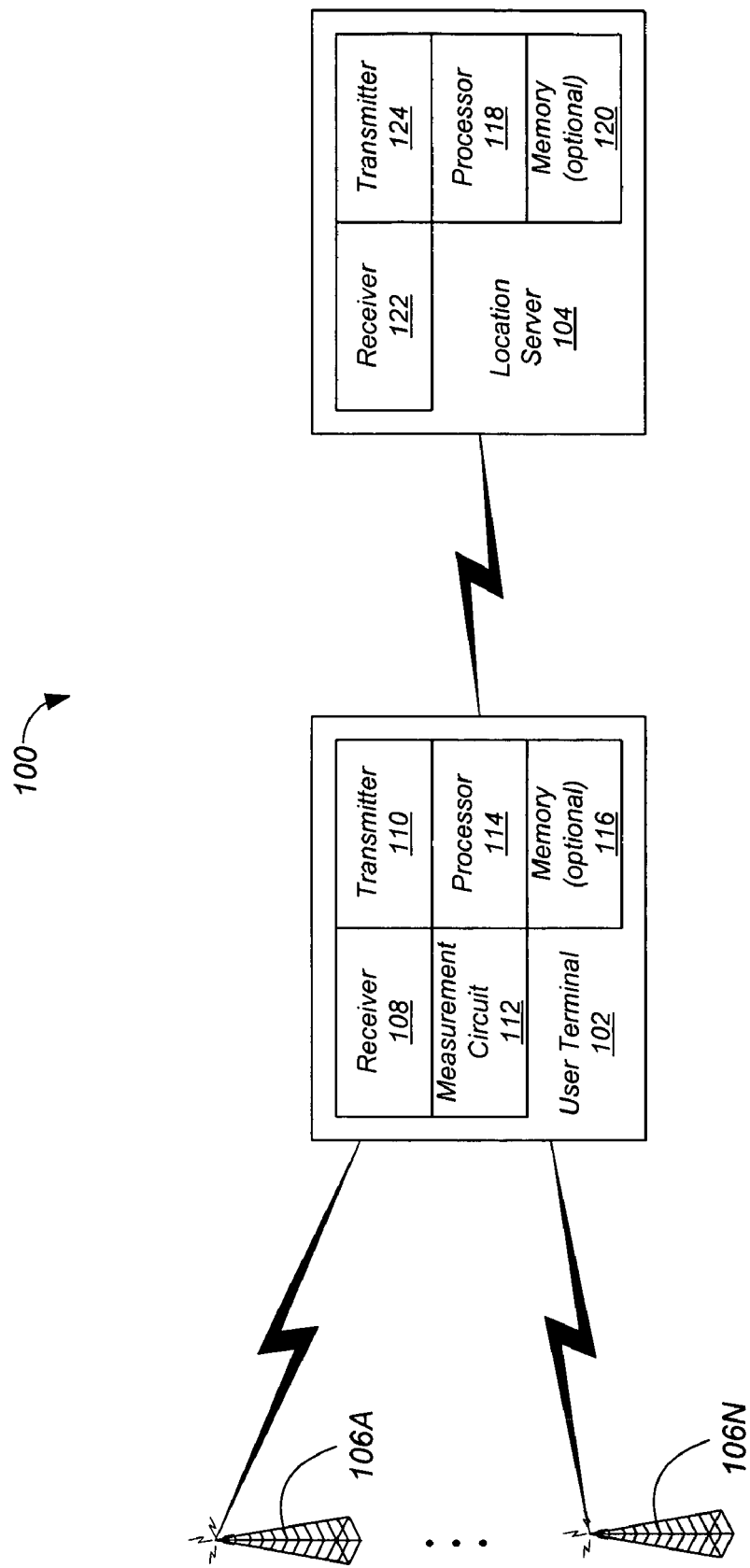
FIG. 1 shows a location identification system according to a preferred embodiment of the present invention.

The leading digit(s) of each reference numeral used in this specification indicates the number of the drawing in which the reference numeral first appears.

DETAILED DESCRIPTION

Embodiments of the present invention provide apparatus, methods, and computer programs for location identification using broadcast wireless signal signatures. While the wireless signals preferably include, and are discussed in terms of, broadcast television signals, the wireless signals can also or instead include broadcast radio signals, radio navigation aids, wireless local area network (LAN) signals, cellular phone networks, and the like. Embodiments of the present invention select one or more possible locations for an apparatus by comparing a signature assembled from measurements of the characteristics of the wireless signals, such as their signal strength, type, frequency, frequency offset, information content, and the like, to similar known signatures for known locations. The selected location can be used, in conjunction with measurements of the wireless signals, to calculate a precise location for the apparatus.

Television positioning technology uses broadcast TV signals to determine the exact location of an electronic device. This technique uses the principle of measuring propagation delays between TV broadcast towers and the device, combining measurements from multiple TV channels, and computing the device's precise location via multilateration, which is the fixing of a position by reference to the time difference of arrival of multiple signals. Television positioning techniques are disclosed in patent applications Ser. No. 10/867,577 filed Jun. 14, 2004, Ser. No. 09/932,010 filed Aug. 17, 2001, Ser. No. 09/932,010 filed Aug. 17, 2001, Ser. No. 10/397,068 filed Mar. 24, 2003, and Ser. No. 10/290,984 filed Nov. 8, 2002, the disclosures thereof incorporated by reference herein in their entirety. Positioning techniques using digital audio broadcast signals are disclosed in patent application Ser. No. 10/741,431 filed Dec. 18, 2003, the disclosure thereof incorporated by reference herein in its entirety.

However, it is desirable to know exactly which broadcast sources are being detected in this process. Television channels can be re-used in different cities, and the multilateration results will be quite different when using channel 2 from Los Angeles vs. channel 2 from New York. The position calculation depends on knowledge of the correct transmitter locations for each detected channel, which depends on knowing the approximate location of the device within the TV coverage domain. Once an approximate location of the device (e.g., to the nearest city) is identified, it becomes easy to determine the specific local television transmitters in use. This is because the television broadcast network is designed to have maximum clarity on every channel, which means having minimum interference on every channel. Transmitters on the same channel that can potentially interfere with each other are separated by great distances to avoid overlap. So for every detected channel, the specific transmitter source can be identified with very little ambiguity. For example, if the device is known to be somewhere in Los Angeles and it detects channel 2, it is clear that it is receiving KCBS, serving Los Angeles, and not WCBS, serving New York.

That still leaves the matter of how to identify the rough seed location of the device in the first place. There are many alternate technologies that can provide this information (e.g., GPS, cellular networks, etc.), but there are many situations where these other technologies are not available or lack coverage (e.g., GPS does not work indoors). In fact, one of the strengths of television-based positioning is that it can be used in places where other technologies are known to fail.

One possibility is to use the television signals themselves, and other signals of opportunity, to make this initial estimation. Since television, navigation aids, and other wireless broadcasts are regional, the specific combination of signals in any location is unique. When enough signal characteristics can be measured from received channels, it is possible to identify an approximate location based on a "wireless channel signature."

According to embodiments of the present invention, a device at an unknown location measures the local wireless channel signature, uses that signature to identify the approximate location of the device, and then optionally uses the approximate location to seed a precise television location computation. Thus without assistance from GPS and similar technologies, it is possible to determine a device's precise location in two steps: 1) identifying the approximate location with wireless channel signatures, and 2) computing the precise location with multilateration using the approximate location as a reference point. Thus a device can position itself from a "cold start" without other information such as GPS.

FIG. 1 shows a location identification system 100 according to a preferred embodiment of the present invention. System 100 comprises a user terminal 102, a location server 104, and a plurality of transmitters 106A-N. User terminal 102 comprises a receiver 108, a transmitter 110, a measurement circuit 112, a processor 114, and an optional memory 116. Location server 104 comprises a receiver 122, a transmitter 124, a processor 118, and an optional memory 120. User terminal 102 preferably communicates wirelessly with location server 104, although other modes are contemplated.

FIG. 1 is used to illustrate various aspects of the invention but the invention is not limited to this implementation. For example, the phrase "user terminal" is meant to refer to any object capable of implementing the techniques described herein. Examples of user terminals include PDAs, mobile phones, cars and other vehicles, and any object which could include a chip or software implementing the techniques. User terminal 102 is not intended to be limited to objects which are "terminals" or which are operated by "users."

Figure 2:
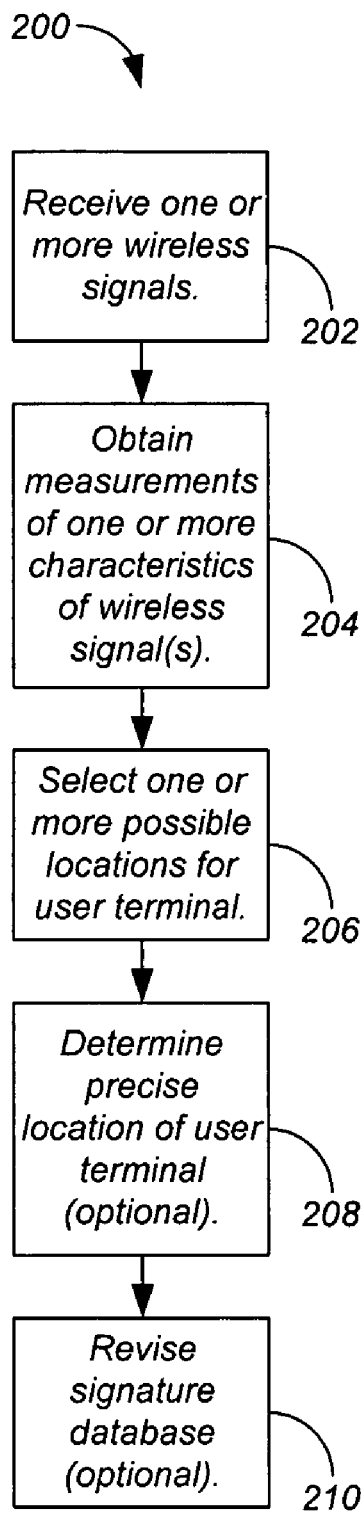
FIG. 2 shows a process for the system of FIG. 1 according to a preferred embodiment of the present invention.

FIG. 2 shows a process 200 for system 100 according to a preferred embodiment of the present invention. Receiver 108 of user terminal 102 receives one or more wireless signals (step 202). The wireless signals preferably include one or more broadcast television signals, but can also or instead include one or more broadcast radio signals, one or more wireless local area network (LAN) signals, and the like. Measurement circuit 112 obtains measurements of one or more characteristics of each of the wireless signals (step 204). The measurements together form a signature that is used to select one or more possible locations for user terminal 102 (step 206), as described in detail below. The measurements of the wireless signals can include characteristics such as signal strength, type, frequency, frequency offset, and others. For example, some TV stations broadcast a signal representing their call letters as part of the TV signal. As another example, some TV stations includes a mix of utility signals such as closed caption signals, ghost canceling reference signals, and the like. Such signals can be included in the signal signatures.

Television broadcasts are carefully regulated to maximize signal quality with a finite set of shared broadcast channels. Transmitters are selectively allocated so that broadcasters on the same channel are far enough away from each other to avoid interference. However, cities are geographically arranged with irregular shapes, sizes, and spacing. And by the same token, television transmitters are installed with irregular spacing and coverage footprints. This has the effect of shuffling or randomizing the order in which transmitters are allocated in order to maintain a "clean" network.

These variations in channel re-use patterns cause the active TV signal set (that is, all operating channels in an area) to vary from one city to the next. Each market is served by a subset of all the possible television transmissions (channels 2 through 69 in the U.S.). Similarly, other wireless broadcasts, like AM/FM radio, navigation aids, and cellular networks, can be combined to form regionally unique channel sets. When that set can be identified and is unique enough, it will match the theoretical channel set for the city of interest, or at least narrow the search down to a very small number of candidates.

In addition to a channel's presence or absence, there are other kinds of information that can be collected and compared to help identify specific transmitters and cities. When all the pieces of channel information are gathered and combined, they collectively form a wireless channel signature which can be used for localization. According to embodiments of the present invention, a signature measured by an electronic device in some unknown city is compared against a database of wireless channel signatures to find one or more matches. Channel characteristics used in wireless channel signatures preferably include channel allocations (whether a channel is present), channel types (whether a channel is analog, digital, or has some other broadcast type or sub-type), frequency, frequency offset (deviation from nominal channel frequencies), and the like.

As for TV channel allocation, most cities have several channels serving the average viewer. This gives the general public a variety of programming to choose from. For example, a typical U.S. city may have multiple network channels (e.g., ABC, CBS, NBC, FOX), public channels (e.g., PBS), shopping networks, and local access channels. Each of these television transmitters has been allocated a specific broadcast channel within the available television spectrum. In the U.S., there are 67 possible channel allocations (numbered 2 thru 36 and 38 thru 69). These allocations are regulated by the FCC to ensure that signals do not interfere with each other and thus provide the best possible viewing signal to the public. This allocation procedure takes into account signal strength, propagation losses, terrain features, and many other factors to determine which channels to allocate in each market. Similar channel allocation rules apply to nearly all broadcast signals (e.g., AM/FM radio, navigation aids, etc.).

In the most basic sense, this means that no two neighboring cities use the same channels. When many neighboring cities are considered together, the channel allocations in each city affect all of its neighbors and vice versa. The combination of channels allocated around each city will vary. In the U.S., there are over 4,000 licensed television broadcasts, each assigned to one of the 67 possible channels. This obviously means that each channel is used simultaneously by many transmitters throughout the country. The optimization efforts of the FCC make certain that all same-channel broadcasts are separated from each other to avoid overlap.

As for TV channel types, broadcast television technology originally began with analog modulation technologies like NTSC in the U.S., PAL, SECAM, and other variants in other countries. Now digital television standards are being introduced, like ATSC in the U.S., DVB-T in Europe, and ISDB-T in Japan.

At present, the U.S. is transmitting both analog (NTSC) and digital (ATSC) broadcasts simultaneously, giving consumers time to transition from their old analog receivers to new digital receivers. This means that within any given city, some broadcasters might be transmitting both analog and digital versions of their programming on separate channels. These digital channels have been introduced to each market using the same rules for minimizing channel interference, resulting in a mix of analog and digital channels that varies from market to market. For example, if a device detects a digital TV signal on channel $C_i$, it is clear that the device is not located in a city where the signal on channel $C_i$ is analog. The same goes for all the other detected channels, $C_j$, $C_k$, etc. Considering all the channels together, the particular pattern of analog and digital signals become characteristic of specific geographic regions.

As for frequency and frequency offset, the FCC further optimizes the allocation of channels by specifying frequency offsets for individual transmissions. This means that instead of transmitting exactly on their designated channel, some broadcasters shift their transmission to slightly higher or lower frequencies. This helps spread broadcasters from each other in frequency, thus further reducing the potential for interference from neighboring broadcasters.

The direction (higher or lower) and amount of the offset is individually determined for each transmitter because it depends on which other transmitters are in the neighborhood. This gives each transmitter some distinctive characteristics, even compared to other transmitters on the same channel in other cities. So in addition to a channel's presence, its particular frequency offset adds more particularity to the channel signature that further refines its uniqueness, giving greater precision to the signature matching process. For example, if a device detects a signal on channel 2 with a negative 10 kHz offset, the device is probably not in a city where the local channel 2 offset is positive 10 kHz.

Referring again to FIGS. 1 and 2, one or more of a plurality of possible locations of user terminal are selected based on the measurements and a plurality of associations each associating one of the possible locations with expected values for the measurements (that is, the signatures) for that location. In some embodiments, location server 104 performs the selection. According to such embodiments, transmitter 110 of user terminal 102 transmits the measurements to location server 104. Receiver 122 of location server 104 receives the measurements. Processor 118 of location server 104 performs the selection using the received measurements and the associations (that is, the signature database) stored in memory 120. Transmitter 124 optionally sends the selected location(s) to user terminal 102.

In some embodiments, user terminal 102 performs the selection locally. According to such embodiments, processor 114 of user terminal 102 performs the selection using the associations stored in memory 116.

Each city or region is associated with a signature representing the available channels in that area. These expected wireless channel signatures can be created in many ways including the use of published transmitter information, simulation of receivable channels, actual measurements taken from each area, or a combination of these techniques.

Finding a match for a signature within the database is equivalent to finding a "distance" to each of the signatures. Signatures that are "close" to each other represent a good match, while signatures that are "far apart" do not match well. For clarification, consider an environment like the U.S., where there are 67 possible TV channel slots (on/off), 67 slots for channel types (analog/digital), and 67 possible frequency offsets for a theoretical total of 201 "degrees of freedom." Each signature can be thought of as a point within this N-dimensional space and the distance between points will indicate the difference or delta between signatures.

Preferably the distance is determined between a first vector $x_i$ comprising the measurements made by user terminal 102 and one or more second vectors $x_j$ each comprising the expected values of the measurements. When the vectors are represented as $$x_i = [x_{i1}, x_{i2}, \ldots, x_{iN}] \quad (1)$$

and $$x_j = [x_{j1}, x_{j2}, \ldots, x_{jN}] \quad (2)$$

the distance between them can be measured in many ways (e.g., Hamming distance, etc.), but for most cases is it sufficient and easiest to use the standard Euclidian distance equation $$|x_i - x_j| = \sqrt{\sum_{n=1}^{N} (x_{in} - x_{jn})^2} \quad (3)$$

The signatures with the fewest differences have the best matching quality. Each dimension in the "signature space" can be scaled to give each measurement a different weighting to optimize the selectivity between signatures. For example, detecting a digital channel where an analog channel is expected is usually an important indication of a mismatch, whereas detecting a variation in frequency offset (possibly due to small measurement errors) is a weaker indication of signature mismatch. The channel type mismatch is therefore preferably weighted more than the frequency offset deviation. When considered together, after appropriate weighting has been applied, the signature distances indicate the overall signature match quality.

However, most consumer electronic devices can make only relative frequency measurements because the local oscillators used on these devices are usually not referenced to any absolute timing reference (e.g., atomic clocks, GPS, etc.). Thus all frequency measurements from a particular device will have a built-in scaling error. For example, a device might have an oscillator that is 1% faster than nominal. From this device's perspective, all measured frequencies will appear to be about 99.01% of their actual value. No matter what the scaling factor is, it applies to all frequencies equally, so for a scaling factor s and a nominal frequency $F_i$ the measured frequency at the device is given by $$f_i = sF_i \quad (4)$$

Without compensation for this frequency measurement scaling, the estimates of frequency offsets can be severely skewed. For example, a U.S. NTSC TV broadcast on channel 2 has a nominal pilot frequency of 55.250 MHz. A device with a clock that is 0.1% faster than nominal would see this channel at 55.195 MHz, which looks like a negative offset of about 55 kHz. The same receiver would see channel 69, nominally 801.250 MHz, at 800.450 MHz, which looks like a negative offset of about 800 kHz. Higher frequency channels will have larger frequency offset errors.

It is desirable to compensate for the scaling factor, but that value is generally not known and can even drift slowly over time. Therefore, it is not useful to directly compare the measured frequencies $f_i$ with the expected frequencies $F_i$ in the signature database. To negate the effect of the scaling factor, embodiments of the present invention compare frequency ratios instead. That is, ratios of the frequency measurements are compared to corresponding ratios of the expected values for the frequency measurements. This technique is preferably applied to all frequency measurements, including measurement of absolute and offset frequencies. For example, given a second frequency measurement $f_j$ and its expected value $F_j$, the comparison is given by $$\frac{f_i}{f_j} = \frac{sF_i}{sF_j} = \frac{F_i}{F_j} \quad (5)$$

Ratios of measured frequencies should always equal the ratios of theoretically perfect frequencies regardless of the device's frequency scaling error. To compare in units of frequency, both sides of equation (5) can be multiplied by the nominal frequency $F_j$ to yield $$\frac{f_i}{f_j} F_j = F_i \quad (6)$$

Organizing the pairwise ratios of frequencies $f_i$ and $f_j$ in matrix format yields $$\begin{bmatrix} \frac{f_1}{f_1} & \frac{f_1}{f_2} & \cdots & \frac{f_1}{f_N} \\ \frac{f_2}{f_1} & \frac{f_2}{f_2} & \cdots & \frac{f_2}{f_N} \\ \vdots & \vdots & \ddots & \vdots \\ \frac{f_N}{f_1} & \frac{f_N}{f_2} & \cdots & \frac{f_N}{f_N} \end{bmatrix} \quad (7)$$

which is compared against an expected value matrix given by $$\begin{bmatrix} \frac{F_1}{F_1} & \frac{F_1}{F_2} & \cdots & \frac{F_1}{F_N} \\ \frac{F_2}{F_1} & \frac{F_2}{F_2} & \cdots & \frac{F_2}{F_N} \\ \vdots & \vdots & \ddots & \vdots \\ \frac{F_N}{F_1} & \frac{F_N}{F_2} & \cdots & \frac{F_N}{F_N} \end{bmatrix} \quad (8)$$

The relationship in equation (6) allows the rearrangement of the matrix as $$\begin{bmatrix} \frac{f_1}{f_1} F_1 & \frac{f_1}{f_2} F_2 & \cdots & \frac{f_1}{f_N} F_N \\ \frac{f_2}{f_1} F_1 & \frac{f_2}{f_2} F_2 & \cdots & \frac{f_2}{f_N} F_N \\ \vdots & \vdots & \ddots & \vdots \\ \frac{f_N}{f_1} F_1 & \frac{f_N}{f_2} F_2 & \cdots & \frac{f_N}{f_N} F_N \end{bmatrix} \quad (9)$$

which is compared against an expected value matrix given by $$\begin{bmatrix} F_1 & F_1 & \cdots & F_1 \\ F_2 & F_2 & \cdots & F_2 \\ \vdots & \vdots & \ddots & \vdots \\ F_N & F_N & \cdots & F_N \end{bmatrix} \quad (10)$$

where any differences between matrices (9) and (10) indicate a deviation of one or more channels from their expected frequency offsets.

This comparison can be simplified somewhat because comparing a frequency ratio and its reciprocal is redundant. Therefore, the lower triangle of the matrix is discarded, without losing any information. Ratios of frequencies to themselves are also of no use, so all the diagonal elements are discarded as well. The resulting matrices are given by $$\begin{bmatrix} 0 & \frac{f_1}{f_2}F_2 & \cdots & \frac{f_1}{f_N}F_N \\ 0 & 0 & \cdots & \frac{f_2}{f_N}F_N \\ \vdots & \vdots & \ddots & \vdots \\ 0 & 0 & \cdots & 0 \end{bmatrix} \quad (11)$$

and $$\begin{bmatrix} 0 & F_1 & \cdots & F_1 \\ 0 & 0 & \cdots & F_2 \\ \vdots & \vdots & \ddots & \vdots \\ 0 & 0 & \cdots & 0 \end{bmatrix} \quad (12)$$

All the non-zero elements can be collapsed into a simple vector form for easy comparison. For example, for N=4, the vectors are $$\left[\frac{f_1}{f_2}F_2, \frac{f_1}{f_3}F_3, \frac{f_1}{f_4}F_4, \frac{f_2}{f_3}F_3, \frac{f_2}{f_4}F_4, \frac{f_3}{f_4}F_4\right] \quad (13)$$

and $$[F_1, F_1, F_1, F_2, F_2, F_3] \quad (14)$$

This problem is quite manageable for two reasons. First, there is an upper bound to the problem size. The total number of possible broadcast channels in any country is finite and relatively small. Second, only the subset of received channels needs to be compared. Each city typically utilizes a small subset of all the defined channel slots, leaving several open channels for neighboring cities to use. The computation of even several hundred frequency ratios is well within the capability of even modest computing resources. In vector form, it is easy to combine the frequency measurements with the other parts of the TV channel signature and use the normal "distance" calculation in N-dimensional space to determine match quality.

Referring again to FIGS. 1 and 2, once one or more possible locations have been selected for user terminal 102, process 200 optionally determines a precise location of user terminal 102 based on the possible location(s), the wireless signals received by user terminal 102, and locations of transmitters 106 of the wireless signals (step 208). This precise location is preferably performed according to the techniques disclosed in the patent applications cited above, and can be performed by user terminal 102, location server 104, or some combination of the two. When more than one possible location is selected, a precise location can be determined for each. Then the best of the precise locations is selected.

Once a precise location for user terminal 102 is known, the wireless signal signature collected by user terminal 102 optionally is used to revise the signature database, for example to correct any errors or to introduce new data (step 210).

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
    a receiver to receive a plurality of wireless television signals each representing a television channel; and
    a measurement circuit to identify the television channels based on the wireless television signals;
    wherein one or more of a plurality of possible locations of the apparatus are selected based on identities of the television channels identified by the measurement circuit and a plurality of associations each associating one of the possible locations with identities of the television channels expected at the one of the possible locations.

2. The apparatus of claim 1:
    wherein a precise location of the apparatus is determined based on the one or more possible locations, one or more of the wireless television signals, and locations of transmitters of the one or more of the wireless television signals.

3. The apparatus of claim 1, further comprising:
a transmitter to transmit the identities of the television channels identified by the measurement circuit to a location server, wherein the location server selects the one or more possible locations of the apparatus.

4. The apparatus of claim 1, further comprising:
a memory to store the associations; and a processor to select the one or more possible locations of the apparatus.

5. An apparatus comprising:
a receiver to receive identities of a plurality of television channels identified by a remote device based on a plurality of wireless television signals each representing one of the television channels; and
a processor to select one or more of a plurality of possible locations of the remote device based on the identities of the plurality of television channels and a plurality of associations each associating one of the possible locations with identities of the television channels expected for the one of the possible locations.

6. The apparatus of claim 5:
wherein, to select one or more of a plurality of possible locations of the remote device, the processor determines distances between a first vector comprising the identities of the plurality of television channels received by the receiver and one or more second vectors each comprising identities of the plurality of television channels expected for one of the possible locations, and selects the one or more of a plurality of possible locations of the remote device based on the distances.

7. The apparatus of claim 5, further comprising:
a transmitter to transmit a signal representing the one or more possible locations of the remote device.

8. The apparatus of claim 5:
wherein the processor determines a precise location of the remote device based on the one or more possible locations, one or more of the wireless television signals, and locations of transmitters of the one or more of the wireless television signals.

9. Tangible computer-readable media embodying instructions executable by a computer to perform a method comprising:
receiving identities of a plurality of television channels identified by a remote device based on a plurality of wireless television signals each representing one of the television channels; and
selecting one or more of a plurality of possible locations of the remote device based on the identities of the plurality of television channels and a plurality of associations each associating one of the possible locations with identities of the television channels expected for the one of the possible locations.

10. The computer-readable media of claim 9, wherein selecting one or more of the plurality of possible locations of the remote device comprises:
determining distances between a first vector comprising the identities of the plurality of television channels received by the receiver and one or more second vectors each comprising identities of the plurality of television channels expected for one of the possible locations; and
selecting the one or more of a plurality of possible locations of the remote device based on the distances.

11. The computer program of claim 9, further comprising:
causing a transmitter to transmit a signal representing the one or more possible locations of the remote device.

12. The computer program of claim 9, further comprising:
determining a precise location of the remote device based on the one or more possible locations, one or more of the wireless television signals, and locations of transmitters of the one or more of the wireless television signals.

* * * * *